(12) United States Patent
Yang et al.

(10) Patent No.: US 11,803,709 B2
(45) Date of Patent: Oct. 31, 2023

(54) COMPUTER-ASSISTED TOPIC GUIDANCE IN DOCUMENT WRITING

(71) Applicant: International Business Machines Corporation, Armonk, NY (US)

(72) Inventors: Xiang Yu Yang, Xi'an (CN); Wen Jie Hao, Xi'an (CN); Zhong Fang Yuan, Xi'an (CN); Wang Hu Dang, Xi'an (CN); Deng Xin Luo, Xian (CN); Jia Yong Xie, Xi'an (CN); Wen Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 17/448,552

(22) Filed: Sep. 23, 2021

(65) Prior Publication Data

US 2023/0090993 A1 Mar. 23, 2023

(51) Int. Cl.
*G06F 40/30* (2020.01)
*G06F 16/93* (2019.01)
*G08B 21/18* (2006.01)

(52) U.S. Cl.
CPC .............. *G06F 40/30* (2020.01); *G06F 16/93* (2019.01); *G08B 21/18* (2013.01)

(58) Field of Classification Search
CPC ................................. G06F 40/30; G06F 16/93
See application file for complete search history.

(56) References Cited

U.S. PATENT DOCUMENTS

| 9,442,930 | B2 | 9/2016 | Szucs | |
|---|---|---|---|---|
| 2011/0078167 | A1* | 3/2011 | Sundaresan | ............. G06F 40/30 707/765 |
| 2011/0119248 | A1 | 5/2011 | Abe | |

(Continued)

FOREIGN PATENT DOCUMENTS

| CN | 107088882 A | 8/2017 |
|---|---|---|
| CN | 110245355 A | 9/2019 |

(Continued)

OTHER PUBLICATIONS

Hutson, Matthew, "Robo-writers: the rise and risks of language-generating AI", nature, Mar. 3, 2021, © Springer Nature Limited, 14 pages, <https://www.nature.com/articles/d41586-021-00530-0>.

(Continued)

*Primary Examiner* — Ibrahim Siddo
(74) *Attorney, Agent, or Firm* — Stephen R. Yoder

(57) ABSTRACT

A method, computer program product and computer system to provide topic guide during document drafting is provided. A processor retrieves at least one section of text from a document. A processor receives a target topic for the document. A processor extracts at least one local topic from the at least one section of text. A processor generates a semantic network comprising the at least one local topic and the target topic. A processor determines a deviation value for the at least one local topic based on a distance between the at least one local topic and the target topic in the semantic network. A processor, in response to the deviation value exceeding a threshold value, alerts a user that the at least one section of text from the document is off-topic from the target topic.

20 Claims, 5 Drawing Sheets

(56) References Cited

U.S. PATENT DOCUMENTS

2011/0270830 A1* 11/2011 Stefik .................... G06F 16/353
707/731

FOREIGN PATENT DOCUMENTS

| CN | 110765360 A | 2/2020 |
| WO | 2020253583 A1 | 12/2020 |

OTHER PUBLICATIONS

Lomas, Natasha, "Meet Articoolo, the robot writer with content for brains", Tech Crunch, Jun. 29, 2016, 13 pages, <https://techcrunch.com/2016/06/28/meet-articoolo-the-robot-writer-with-content-for-brains/>.

McCoy, Julia, "Content Creation Robots Are Here [Examples]", Nov. 12, 2017, 22 pages, <https://contentmarketinginstitute.com/2017/11/content-creation-robots-examples/>.

* cited by examiner

COMPUTER-ASSISTED TOPIC GUIDANCE IN DOCUMENT WRITING

BACKGROUND OF THE INVENTION

The present invention relates generally to the field of natural language processing, and more particularly to topic modeling of a document to provide guidance to a user.

Natural language processing (NLP) is a subfield of linguistics, computer science, and artificial intelligence concerned with the interactions between computers and human language, in particular how to program computers to process and analyze large amounts of natural language data. The result is a computer capable of "understanding" the contents of documents, including the contextual nuances of the language within them. The technology can then accurately extract information and insights contained in the documents as well as categorize and organize the documents themselves.

SUMMARY

Embodiments of the present invention provide a method, system, and program product to provide topic guide during document drafting. A processor retrieves at least one section of text from a document. A processor receives a target topic for the document. A processor extracts at least one local topic from the at least one section of text. A processor generates a semantic network comprising the at least one local topic and the target topic. A processor determines a deviation value for the at least one local topic based on a distance between the at least one local topic and the target topic in the semantic network. A processor, in response to the deviation value exceeding a threshold value, alerts a user that the at least one section of text from the document is off-topic from the target topic.

DETAILED DESCRIPTION

Figure 1:
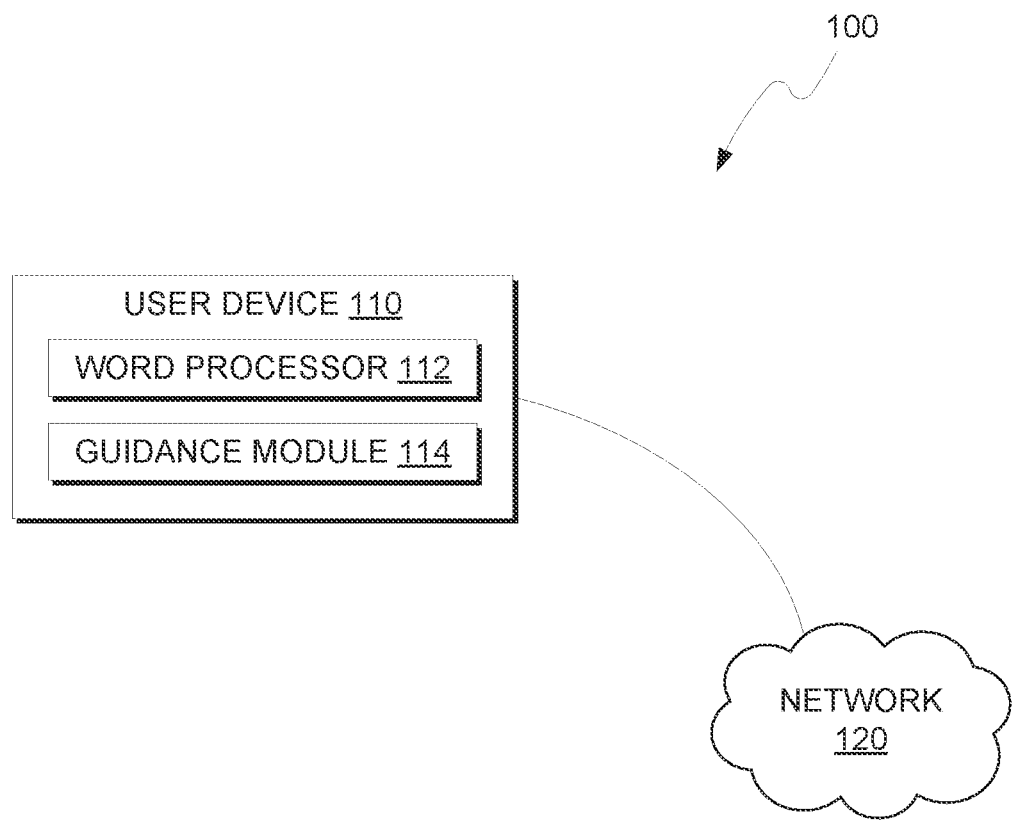
FIG. 1 is a functional block diagram illustrating a networked environment, in accordance with an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes user device 110 connected to network 120. User device 110 includes word processor 112 and guidance module 114.

In various embodiments of the present invention, user device 110 is a computing device that can be a standalone device, a server, a laptop computer, a tablet computer, a netbook computer, a personal computer (PC), or a desktop computer. In another embodiment, user device 110 represents a computing system utilizing clustered computers and components to act as a single pool of seamless resources. In general, user device 110 can be any computing device or a combination of devices with access to guidance module 114 and is capable of executing word processor 112. User device 110 may include internal and external hardware components, as depicted and described in further detail with respect to FIG. 5.

In this exemplary embodiment, word processor 112 and guidance module 114 are stored on user device 110. However, in other embodiments, word processor 112 and guidance module 114 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between user device 110 and other devices (not shown), in accordance with a desired embodiment of the present invention.

In various embodiments, word processor 112 is any application that provides users the ability to create, edit, view or otherwise interact with a text-based document. In some scenarios, word processor 112 is a native application that executes locally on user device 110. In other scenarios, word processor 112 is web-based or web-enabled and is accessible via a browser or containerized webapp (not shown). One of ordinary skill in the art will appreciate that word processor 112 can be any program, application, or the like that enables interaction with any document or file that contains text.

In various embodiments, word processor 112 includes, or has access to, guidance module 114. As discussed herein, guidance module 114 provides assistance to a user who is drafting text in a document. As discussed herein, a user includes, but is not limited to, the following: (i) a single individual human; (ii) an artificial intelligence entity with sufficient intelligence to act as a user or subscriber; and/or (iii) a group of related users or subscribers. Guidance module 114 is provided either a theme or topic for a document by the user and, as the user drafts the document, guidance module 114 evaluates the content of the document to determine if the text of the documents matches or is otherwise similar to the theme or topic provided, thereby guiding the user during drafting or editing of a document. In various embodiments, guidance module 114 generates a semantic network which includes extracted topics of the document. Guidance module 114 adds the overall theme or topic to the semantic network and determines how close the overall topic or theme is to one or more subjects present in the document, or portions thereof, such as on a paragraph or sentence basis.

Figure 4:
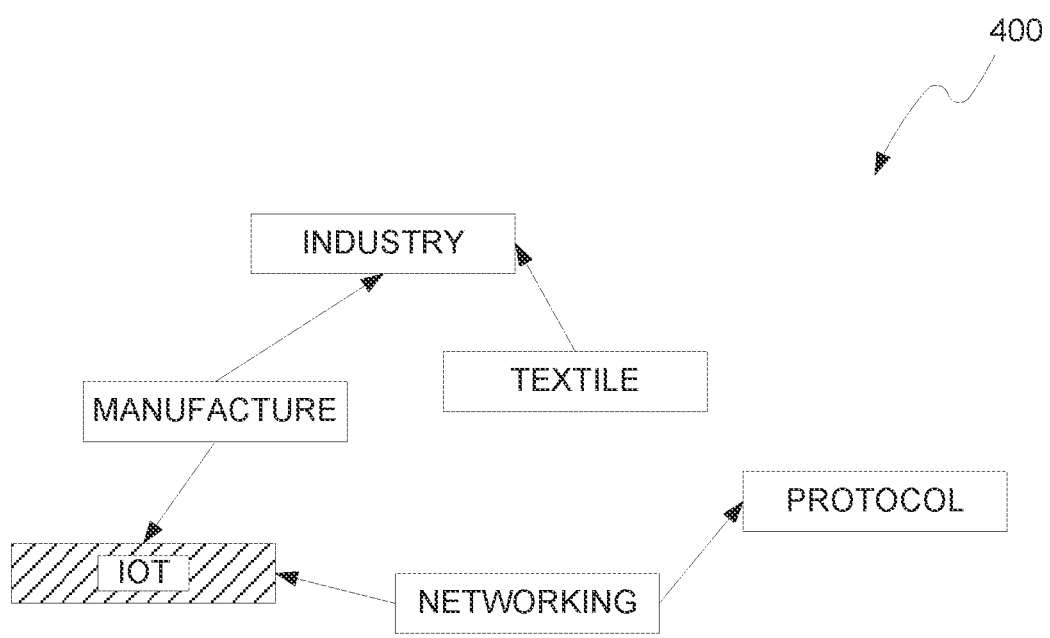
FIG. 4 depicts an example semantic network of local topics and target topics of section of text from a document, in accordance with an embodiment of the present invention.

In various embodiments, guidance module 114 receives a target topic for the document. In some scenarios, the target topic may be an overall subject for the document, such "motorcycles" or "cloud computing". In other scenarios, the target topic may be thematic or tonal, such as "condolences" or "thankful". As discussed herein, guidance module 114 generates a semantic network which includes the target topic, as well as any local topics presented in the document being evaluated for guidance. A semantic network, such the example semantic network depicted in FIG. 4, is a directed graph with various related subjects represented as nodes that are connected via edges that indicate a semantic relationship of commonality or similarity between the nodes, or subjects. In some embodiments, guidance module 114 receives multiple target topics. In such embodiments, guidance module 114 populates the semantic network with each of the received target topics. While the following is discussed in regards to a singular target topic, one of ordinary skill in the art will understand that multiple target topics can be applied without deviating from the embodiments of the invention discussed herein.

In some embodiments, guidance module 114 actively monitors changes and edits to the document received by word processor 112. As a user writes text, makes updates, or otherwise changes the document, guidance module 114 extracts any topics from the newly added or modified sections. In some embodiments, guidance module 114 is provided a document and performs topic guidance to the entirety of the document. In various embodiments, guidance module 114 separates the document into sections for analysis. In some scenarios, guidance module 114 separates the paragraphs of the document into sections. In other scenarios, guidance module 114 separates the sentences of the document into sections. In further scenarios, guidance module 114 receives input from the user which indicates which portions of the documents are to be broken up into sections, such as by use of headings or other indicators.

In various embodiments, guidance module 114 extracts topics from each section of the document. In some scenarios, guidance module 114 includes a topic model to determine the topics discussed in each section. For example, guidance module 114 utilizes the topic model of Latent Dirichlet Allocation (LDA) to extract topics from each section of the document. When employing LDA, guidance module 114 splits each section into tokens where words, or groups of words in the section, are separated and then generates clusters of similar tokens. Based on the distribution of tokens within the clusters, guidance module 114 determines which clusters have the largest portions of tokens and then assigns topics based on the more populated clusters. In other scenarios, guidance module 114 includes a Bidirectional Encoder Representations from Transformers, or BERT model, to determine the topics discussed in the sections. A BERT transformer model digests sequential text from the document (i.e., sentences or paragraphs) and generates word embeddings or phrase embeddings (e.g., more than one word of the document is represented by the embedding) representing the topics or concepts discussed in the text. Based on the generated embeddings from the transformer model, guidance module 114 extracts topics from each section of the document or, as discussed herein, the local topics of each section. One of ordinary skill in the art will appreciate that any natural language processing (NLP) model can be used to extract local topics from a section without deviating from the invention.

In some embodiments, guidance module 114 is configured to receive a target tone from a user. A target tone reflects overall subjective information contained in the sections of the document that convey the underlying tone or emotion of the section. In such embodiments, guidance module 114 performs sentiment analysis on the section to determine a local tone for the section. For example, guidance module 114 is configured to detect a polarity of the section (i.e., negative, neutral or positive) and receive a target polarity from the user. If the local polarity (i.e., the tone of a given section) diverges from the target polarity, then guidance module 114 determines the section to be off-tone and will provide guidance to the user instructing the user of the diverging tone of the section versus the target tone for the document.

In various embodiments, guidance module 114 generates a sematic network which includes the target topic or topics provided by the user in addition to the local topics for each section. In the semantic network, both the target topic and extracted local topics for a section are nodes in the network, with connections or edges indicating the semantic or ontological relationship between the topics, such as depicted in the example sematic network of FIG. 4. In various scenarios, guidance module 114 includes or otherwise has access to a lexical database, such as WordNet, which contains hierarchical semantic relationships for various words. Based on the hierarchical relationships of the lexical database, guidance module 114 determines how the various topics are interconnected in the semantic network, with topic nodes that are closely related in the hierarchical relationships of indicated by lexical database being connected closer to topic nodes that are further down the hierarchical relationships indicated by the lexical database.

In various embodiments, guidance module 114 determines a deviation value between the target topic and extracted local topics from each section of the document. In some embodiments, guidance module 114 determines a length of valid path in the semantic network between the target topic and one of the local topics. In some scenarios, guidance module 114 selects the longest path between the target topic and the local topic. In other scenarios, guidance module 114 selects the shortest path between the target topic and the local topic. Guidance module 114, either automatically or as instructed by the user, may select the shortest or longest path, to tune guidance module 114 to either provide more or less guidance when a user may be off-topic from the target topic in a given section.

Figure 3:
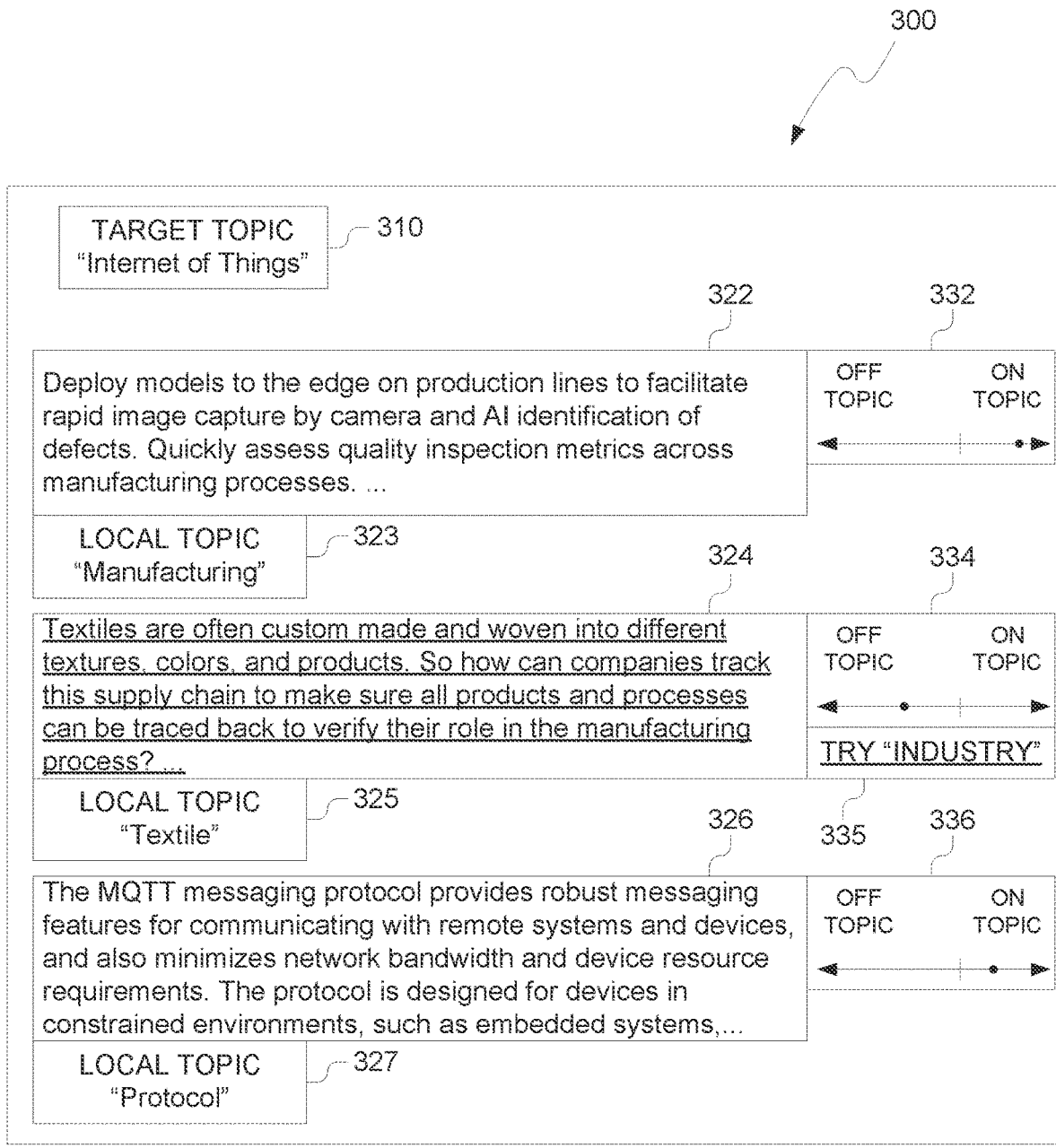
FIG. 3 depicts an example word processor user interface with a guidance module, in accordance with an embodiment of the present invention.

In various embodiments, guidance module 114 compares the deviation value between the target topic and extracted local topics from each section of the document. If the deviation value for a topic in a section is above a threshold value, then guidance module 114 determines the section to be off-topic and will provide guidance to the user, such as depicted in FIG. 3. For sections with multiple local topics, guidance module 114, in some scenarios, determines a deviation value for each local topic. If any local topic is above the threshold value, then guidance module 114 determines the section to be off-topic and will provide guidance to the user. In other scenarios, guidance module 114 may combine the various local topic deviation scores into an average value for the section. In further scenarios, guidance module 114 may select the largest or smallest deviation value of the local topics, using the minimum or maximum deviation value for local topics present in a section.

Figure 2:
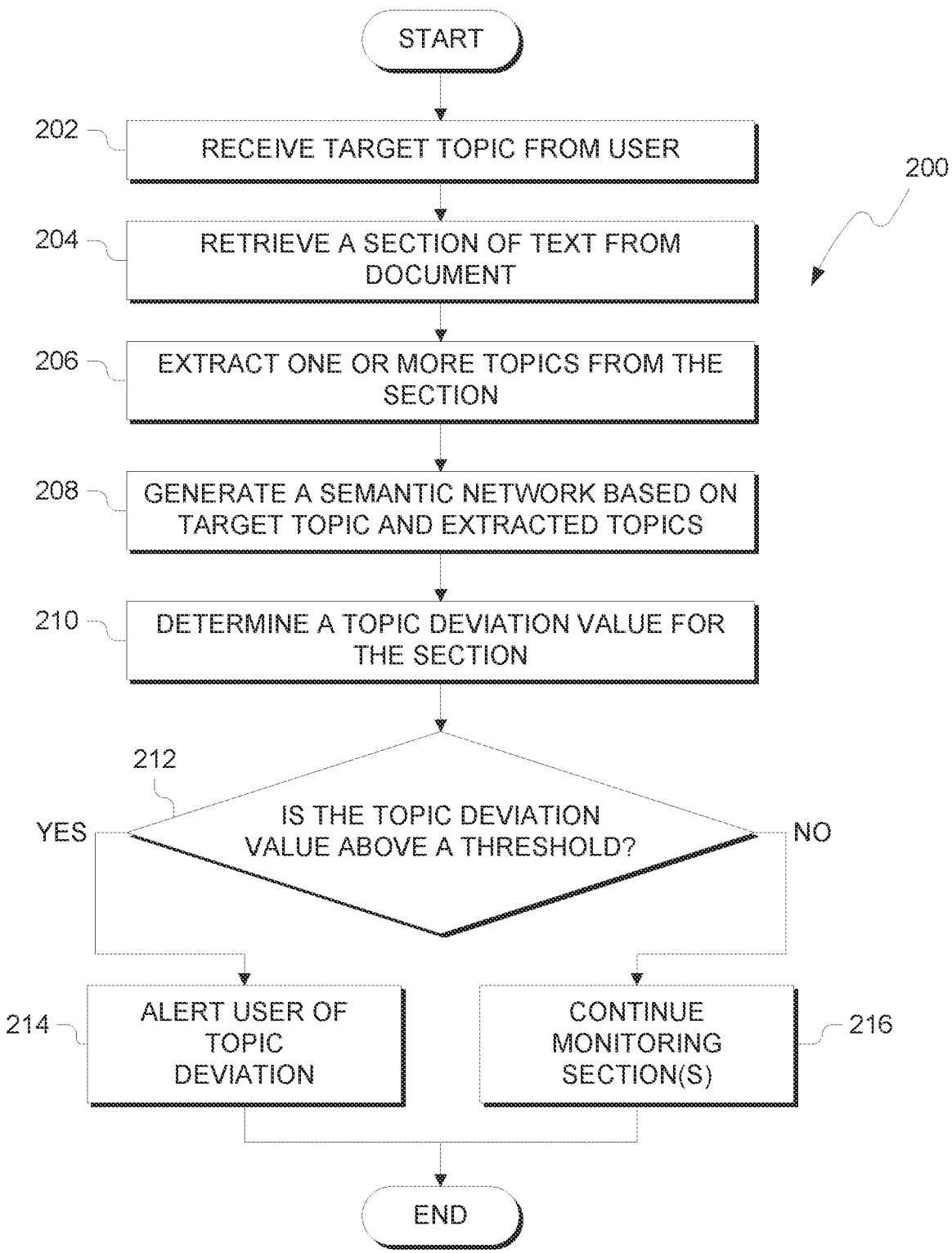
FIG. 2 illustrates operational processes of a guidance module of a word processor on a computing device within the environment of FIG. 1, in accordance with an embodiment of the present invention.

FIG. 2 illustrates operational processes of guidance module 114 of user device 110 within the environment of FIG. 1. In process 202, guidance module 114 receives a target topic from a user for a document that is either currently being drafted by the user or that is at some state of completion (e.g., a post-draft review). In some scenarios, guidance module 114 is configured to receive multiple target topics. While for clarity the following will be discussed in regard to a singular topic, one of ordinary skill will understand that guidance module 114 can perform the following processes for each target topic provided by a user without deviating from the invention.

In process 204, guidance module 114 retrieves a section of text from the document. In some scenarios, a section corresponds to a paragraph of the document. In other scenarios, a section corresponds to sentences or phrases of the document. In some scenarios, guidance module 114 receives input from the user indicating what portions of the document will correspond to a section. For example, user provided headings or tags indicate the sections to be analyzed for topic deviation. In process 206, guidance module 114 extracts one or more topics from a section of the document. For example, guidance module 114 employs a LDA topic model to determine the topics discussed in the section.

In process 208, guidance module 114 generates a semantic network, such as the example semantic network depicted in FIG. 4, which is a directed graph with nodes comprising the target topic and any extracted topics for the section. Based on the hierarchical structure of a lexical database, guidance module 114 maps the relationship between the target topic and any extracted topics for the section, which is represented by the edges in the directed graph of the semantic network. In process 210, guidance module 114 determines a deviation value for the section. The deviation value is based on the number of nodes, or path length, between the target topic and the local topics for the section.

In decision process 212, guidance module 114 compares the deviation value for the section to a threshold value. In some scenarios, guidance module 114 sets the threshold value for deviation based on user-provided input (e.g., during process 202 a user provides input to adjust the threshold value). In another scenario, guidance module 114 automatically adjusts the threshold value based on user feedback (e.g., supervised learning). If the topic deviation value exceeds the threshold (YES branch of process 212), then guidance module 114 alerts the user of the topic deviation for the section (process 214), such as depicted in FIG. 3. If the topic deviation value is below the threshold (NO branch of process 212), then guidance module 114 continues with other sections of the document (process 216).

For scenarios where guidance is provided in a live document (e.g., being currently drafted by a user), then guidance module 114 monitors changes or edits to the document and performed processes 202-212 for newly added or edited sections. As changes or edits are made, guidance module 114 extracts topics from the edited section then adds any new topics from the semantic network or deletes removed topics from the semantic network. Based on the updated semantic network, guidance module 114 determines an updated deviation value for the edited section. If the deviation value crosses the threshold, then guidance module 114 alerts the user if the edits make the section off-topic or removes a preexisting alert if the edit makes the section on-topic (e.g., deviation value is smaller than the threshold).

FIG. 3 depicts an example user interface 300 of word processor 112 with topic guidance provided by guidance module 114. In various embodiments, word processor 112 provides user interface elements and other features the permit users to enter text sections 322, 324 and 326 in a document. In this example user interface 300, a user has provided the target topic 310 for the document, "Internet of Things". As discussed herein, guidance module 114 extracts topics from text sections 322, 324 and 326 that have been generated by the user while drafting a document. For each text section 322, 324 and 326, guidance module 114 determines a respective local topic 323, 325, and 327. In this example user interface 300, guidance module 114 also provides topic deviation indicators 332, 334 and 336 which indicate the deviation value (indicated by the dot) and threshold (indicated by the vertical line).

In the first text section 322, guidance module 114 determines the local topic 323 for the section is "manufacturing" based on the terms "production", "defect", "inspection", and "manufacturing" being part of a manufacturing cluster in a LDA topic model. In the second text section 324, guidance module 114 determines the local topic 325 for the section is "textile" based on the terms "textile", "woven", "texture", and "color" being part of a textile cluster in a LDA topic model. In the third text section 326, guidance module 114 determines the local topic 327 for the section is "protocol" or the based on the terms "MQTT" (Message Queue Telemetry Transport TCP/IP protocol), "protocol", "communicating", and "bandwidth" being part of a manufacturing cluster in a LDA topic model.

Looking now to FIG. 4, FIG. 4 depicts an example semantic network 400 generated by guidance module 114 comprising the extracted local topics 323, 325, and 327 and the target topic 310, with target topic 310 "IOT" is indicated with the line markings and local topics 323, 325, and 327 being unmarked. Each of the local topics 323, 325, and 327 and the target topic 310 are inserted as nodes into semantic network 400. Based on the hierarchical indications of a lexical database, additional nodes such as "Industry" and "Networking" are added to semantic network 400 to create a semantic relationship among the topics and intervening topics as well. For each topic in text sections 322, 324 and 326, guidance module 114 determines a deviation value for the respective local topics 323, 325, and 327 when compared to the target topic 310. As can be seen in this example, the local topic 323 "manufacturing" is one deviation away from target topic 310; local topic 325 "Textile" is three deviations away from target topic 310; and local topic 327 "Protocol" is two deviations from target topic 310.

Returning to FIG. 3, guidance module 114 generates topic deviation indicators 332, 334 and 336 based on the deviation values determined based on the example semantic network 400 of FIG. 4. In this example, the threshold value has been set to be three or greater, meaning local topics with a deviation value of three or greater will be determined to be deviating from the target topic. Since both local topics 323 and 327 are within this threshold of deviation, guidance module 114 determines the local topics 323 and 327 do not deviate from the target topic 310 and therefore are determined to be on-topic. Local topic 325 however has a deviation value above the threshold and is therefore determined by guidance module 114 to be off-topic. As such, guidance module 114 adds a visual indicator to text section 324 (as indicated by an underline) to indicate that the section is off-topic. Topic deviation indicators 332, 334 and 336 are also presented to the user to provide more detail regarding the deviation value of each section and the threshold.

In some embodiments, when guidance module 114 determines a section of text is off-topic (i.e., the deviation value exceeds the threshold), then guidance module 114 provides topic suggestion 335. Topic suggestion 335 is a subject in the sematic network the intervenes or is present in a path between the target topic and the local topic. In the example depicted in FIG. 4, text section 324 is determined to be off-topic, with the local topic "Textile" being three nodes away from the target topic "IOT", which is above the threshold of two in this example indicating that text section 324 is off-topic. Following the path of "IOT" to "Manufacture" to "Industry" to "Textile", guidance module 114 populates topic suggestion 335 with a topic along the path that is below the threshold. In this example, guidance module 114 suggests "Industry" as a topic, since it shares the same path (indicating that the topic shares themes and aspects with other topics along the path) and is below the threshold value. By identifying intervening topics in the sematic network along the same path but with shorter deviation values, guidance module 114 suggests a similar topic ("Industry") to the content already present ("Textile"), thereby making edits and changes to make the section on-topic minimal.

Figure 5:
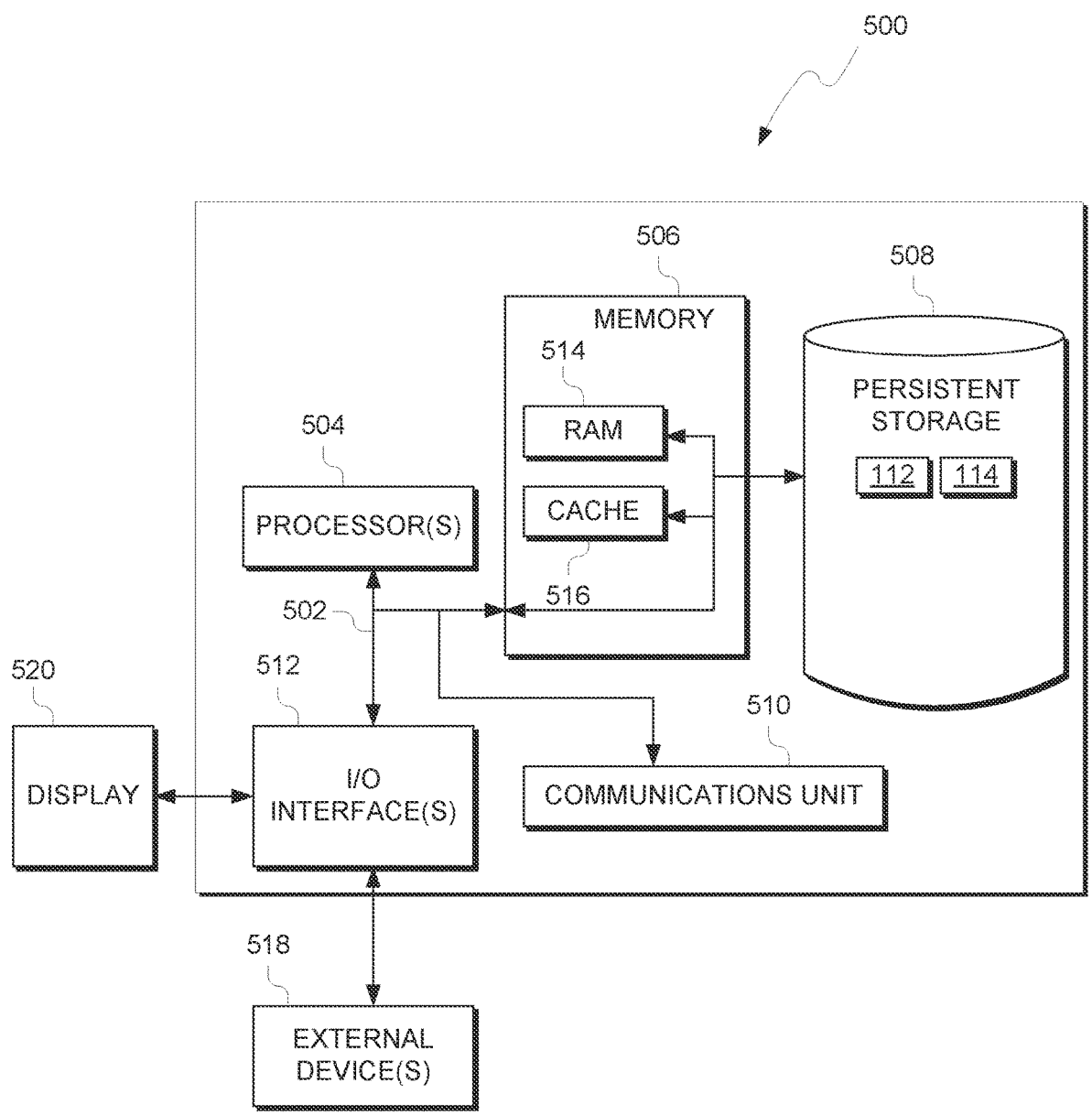
FIG. 5 depicts a block diagram of components of the computing device executing a guidance module, in accordance with an exemplary embodiment of the present invention.

FIG. 5 depicts a block diagram, 500, of components of user device 110, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

User device 110 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Word processor 112 and guidance module 114 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 120. In these examples, communications unit 510 includes one or more network interface cards. Communications unit 510 may provide communications through the use of either or both physical and wireless communications links. Word processor 112 and guidance module 114 may be downloaded to persistent storage 508 through communications unit 510.

I/O interface(s) 512 allows for input and output of data with other devices that may be connected to user device 110. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., word processor 112 and guidance module 114, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
retrieving, by one or more processors, at least one section of text from a document;
receiving, by the one or more processors, a target topic for the document;
extracting, by the one or more processors, at least one local topic from the at least one section of text;
generating, by the one or more processors, a semantic network comprising the at least one local topic and the target topic;
determining, by the one or more processors, a deviation value for the at least one local topic based, at least in part, on a distance between the at least one local topic and the target topic in the semantic network; and
in response to the deviation value exceeding a threshold value, alerting a user that the at least one section of text from the document is off-topic from the target topic.

2. The method of claim 1, the method further comprising:
receiving, by the one or more processors, a target polarity for the document; and
determining, by the one or more processors, at least one local tone of the at least one section of text.

3. The method of claim 2, the method further comprising:
in response to the at least one local tone diverging from the target tone, alerting, by the one or more processors, the user that the at least one section of text from the document is off-tone from the target polarity.

4. The method of claim 1, the method further comprising:
in response to a determination that a change is made to the least one section of text from the document, determining, by the one or more processors, an updated deviation value for the least one section of text; and
in response to the updated deviation value being less than the threshold value, indicating to the user that the section is no longer off-topic.

5. The method of claim 1, wherein alerting the user that the at least one section of text from the document is off-topic from the target topic further comprises:
suggesting, by the one or more processors, a second local topic to the user, wherein the second local topic is an intervening node in the semantic network between the least one local topic and the target topic.

6. The method of claim 1, wherein extracting the at least on topic from the at least one section of text is based on output from a Latent Dirichlet Allocation (LDA) model or a Bidirectional Encoder Representations from Transformers (BERT) model.

7. The method of claim 1, wherein the semantic network is generated based, at least in part on, a lexical database.

8. A computer program product comprising:
one or more computer-readable storage media and program instructions stored on the one or more computer-readable storage media, the program instructions comprising:
program instructions to retrieve at least one section of text from a document;
program instructions to receive a target topic for the document;
program instructions to extract at least one local topic from the at least one section of text;
program instructions to generate a semantic network comprising the at least one local topic and the target topic;
program instructions to determine a deviation value for the at least one local topic based, at least in part, on a distance between the at least one local topic and the target topic in the semantic network; and
in response to the deviation value exceeding a threshold value, program instructions to alert a user that the at least one section of text from the document is off-topic from the target topic.

9. The computer program product of claim 8, the program instructions further comprising:
program instructions to receive a target polarity for the document; and
program instructions to determine at least one local tone of the at least one section of text.

10. The computer program product of claim 9, the program instructions further comprising:
in response to the at least one local tone diverging from the target tone, program instructions to alert the user that the at least one section of text from the document is off-tone from the target polarity.

11. The computer program product of claim 8, the program instructions further comprising:
in response to a determination that a change is made to the least one section of text from the document, program instructions to determine an updated deviation value for the least one section of text; and
in response to the updated deviation value being less than the threshold value, program instructions to indicate to the user that the section is no longer off-topic.

12. The computer program product of claim 8, wherein alerting the user that the at least one section of text from the document is off-topic from the target topic further comprises:
program instructions to suggest a second local topic to the user, wherein the second local topic is an intervening node in the semantic network between the least one local topic and the target topic.

13. The computer program product of claim 8, wherein extracting the at least on topic from the at least one section of text is based on output from a Latent Dirichlet Allocation (LDA) model or a Bidirectional Encoder Representations from Transformers (BERT) model.

14. The computer program product of claim 8, wherein the semantic network is generated based, at least in part on, a lexical database.

15. A computer system comprising:
one or more computer processors;
one or more computer readable storage media; and
program instructions stored on the computer readable storage media for execution by at least one of the one or more processors, the program instructions comprising:
program instructions to retrieve at least one section of text from a document;
program instructions to receive a target topic for the document;
program instructions to extract at least one local topic from the at least one section of text;
program instructions to generate a semantic network comprising the at least one local topic and the target topic;
program instructions to determine a deviation value for the at least one local topic based, at least in part, on a distance between the at least one local topic and the target topic in the semantic network; and
in response to the deviation value exceeding a threshold value, program instructions to alert a user that the at least one section of text from the document is off-topic from the target topic.

16. The computer system of claim 15, the program instructions further comprising:
program instructions to receive a target polarity for the document; and
program instructions to determine at least one local tone of the at least one section of text.

17. The computer system of claim 16, the program instructions further comprising:
in response to the at least one local tone diverging from the target tone, program instructions to alert the user that the at least one section of text from the document is off-tone from the target polarity.

18. The computer system of claim 15, the program instructions further comprising:
in response to a determination that a change is made to the least one section of text from the document, program instructions to determine an updated deviation value for the least one section of text; and
in response to the updated deviation value being less than the threshold value, program instructions to indicate to the user that the section is no longer off-topic.

19. The computer system of claim 15, wherein alerting the user that the at least one section of text from the document is off-topic from the target topic further comprises:
program instructions to suggest a second local topic to the user, wherein the second local topic is an intervening node in the semantic network between the least one local topic and the target topic.

20. The computer system of claim 15, wherein extracting the at least on topic from the at least one section of text is based on output from a Latent Dirichlet Allocation (LDA) model or a Bidirectional Encoder Representations from Transformers (BERT) model.

* * * * *